United States Patent [19]

Pyötsiä

[11] Patent Number: 5,748,469
[45] Date of Patent: May 5, 1998

[54] METHOD AND APPARATUS FOR DETECTING A FAULT OF A CONTROL VALVE ASSEMBLY IN A CONTROL LOOP

[75] Inventor: Jouni Pyötsiä, Helsinki, Finland

[73] Assignee: Neles Controls Oy, Helsinki, Finland

[21] Appl. No.: 699,781

[22] Filed: Aug. 20, 1996

Related U.S. Application Data

[63] Continuation-in-part of Ser. No. 324,653, Oct. 18, 1994, abandoned.

[51] Int. Cl.$^6$ .................................................. G05B 17/00
[52] U.S. Cl. ........................ 364/150; 364/149; 364/152; 364/578; 364/551.01; 364/DIG. 1; 364/266.4; 364/267.7
[58] Field of Search ..................... 364/518, 119, 364/494, 150, 551.01, 431.01, 579, 149, 152, 200 MS File; 73/168; 376/215; 318/565

[56] References Cited

U.S. PATENT DOCUMENTS

| | | | |
|---|---|---|---|
| 4,029,122 | 6/1977 | Jaegtnes | 137/551 |
| 4,213,175 | 7/1980 | Kurihara | 364/119 |
| 4,214,301 | 7/1980 | Kurihara et al. | 364/119 |
| 4,494,207 | 1/1985 | Chang et al. | 364/494 |
| 4,509,110 | 4/1985 | Levesque, Jr. | 364/153 |
| 4,630,189 | 12/1986 | Ohmori et al. | 364/150 |
| 4,747,578 | 5/1988 | Kivipelto | 251/159 |
| 4,941,113 | 7/1990 | Dundics et al. | 364/551.01 |
| 5,129,418 | 7/1992 | Shimomura | 137/486 |
| 5,197,328 | 3/1993 | Fitzgerald | 73/168 |
| 5,233,512 | 8/1993 | Gutz | 364/150 |
| 5,265,035 | 11/1993 | Reifman et al. | 364/551.01 |
| 5,272,647 | 12/1993 | Hayes | 364/551.01 |
| 5,311,562 | 5/1994 | Palusamy et al. | 376/215 |
| 5,422,553 | 6/1995 | MacLennan et al. | 318/565 |
| 5,442,555 | 8/1995 | Reifman et al. | 364/431.01 |
| 5,455,781 | 10/1995 | Reynal et al. | 364/579 |
| 5,486,995 | 1/1996 | Krist et al. | 364/149 |

FOREIGN PATENT DOCUMENTS

| 0 287 299 | 10/1988 | European Pat. Off. . |
|---|---|---|
| 0 315 391 | 5/1989 | European Pat. Off. . |

OTHER PUBLICATIONS

Quade, Jürgen, Fehlerdiagnose an Feldbussystemen, ATP Autoatisierungstechnische Praxis, Oct. 1992, No. 10, Munchen DE.

Abstract, "Abnormality Detecting Device in Plant", Murata, Aug. 2, 1983, Japan.

Primary Examiner—Kevin J. Teska
Assistant Examiner—Russell W. Frejd
Attorney, Agent, or Firm—Cushman Darby & Cushman, Intellectual Property Group of Pillsbury Madison & Sutro LLP

[57] ABSTRACT

A method and apparatus for detecting a fault of an automatically operated control valve assembly. Data consisting of several values of the control signal (i) and corresponding values of the position (h) of the control valve is measured and recorded. A mathematical model for the control valve assembly is defined. The mathematical model is fitted to the data measured from the control signal (i) and the position (h) of the control valve. At least one critical parameter for each component of the valve assembly, that is the valve (2) itself, the actuator (3) and the positioner (5), is chosen. The values and changes of the critical parameters are computed from the mathematical model fitted to the measured data. The component in which the fault is located is detected on the basis of the computed values of the critical parameters.

10 Claims, 5 Drawing Sheets

Friction of
the valve isq contour max likelihood contour gain of the
positioner

- Succesful definition of parameters
- Surface sufficiently curved

METHOD AND APPARATUS FOR DETECTING A FAULT OF A CONTROL VALVE ASSEMBLY IN A CONTROL LOOP

This is a continuation-in-part of application Ser. No. 08/324,653, filed on Oct. 18, 1994 now abandoned.

FIELD OF THE INVENTION

This invention relates to a method for detecting a fault in an automatically operated control valve assembly in a control loop so that data consisting of several values of the control signal and corresponding values of the position of the control valve is measured and recorded. The invention also relates to an apparatus for detecting a fault in an automaticlly operated control valve assembly, the valve assembly including a control valve, an actuator and a digital positioner, as well as means for measuring, transferring, recording and processing data.

BACKGROUND OF THE INVENTION

The importance of advance maintenance of control valves has further increased when it is desired to decrease maintenance costs, to increase safety and to have the processes functioning accurately while saving energy and reducing waste. New positioners based on digital technology give better possibilities for this. On the other hand, the development of new data transfer buses gives better possibilities for transferring diagnostic data from the field device to the automation system and for transmitting measurement data from sensors outside the control valve to the control valve.

A control valve and its operation is known and need not be described here in detail. A quarter turn valve can be for instance a ball valve or a butterfly valve. Examples of a ball valve are disclosed for instance in U.S. Pat. No. 4,747,578. A control valve is actuated by means of an actuator which turns the stem of the closure member between open and closed positions. An actuator can be operated by means of a cylinder-piston device which in turn is regulated by means of a regulation valve. A valve positioner operates the actuator in response to a control signal.

Various systems have been developed for the diagnostics of control valves, and these systems can be used for measuring and testing the valves in order to detect faulted operation. U.S. Pat. Nos. 5,272,647, 5,233,512, 4,509,110, 4,213,175 and 5,129,418 all describe various diagnostic arrangements. However, they do not enable the location of the fault to be detected.

Some systems, such as the one described in U.S. Pat. No. 5,197,328, even make it possible to locate the reason of the faulted operation, but it requires a complicated measurement arrangement and a lot of measurement data from the various components of the control valve assembly, that is from the valve itself, the actuator and the positioner.

SUMMARY OF THE INVENTION

The object of the present invention is to provide a method and an apparatus which are able to independently draw conclusions relating to the faulted operation and to locate the faulted component by means of a simple measurement arrangement and by using a mathematical model of a control valve assembly and a data transfer bus.

The method of the invention is characterized in that a mathematical model for the control valve assembly is defined, the mathematical model is fitted to the data measured from the control signal and the position of the control valve, at least one critical parameter for each component of the valve assembly, that is the valve itself, the actuator and the positioner, is chosen, the values and changes of the critical parameters are computed from the mathematical model fitted to the measured data, the component in which the fault is located is detected on the basis of the computed values of the critical parameters.

The apparatus of the invention is characterized in that the means for processing the data includes a program to fit a mathematical model to the data measured from the control signal and the position of the control valve, to compute the values and changes of at least one critical parameter for each component of the valve assembly, that is the valve itself, the actuator and the positioner, from the mathematical model fitted to the measured data, and to detect the faulted component of the control valve assembly on the basis of the computed values of the critical parameters.

The method is based on identification of certain critical parameters of a mathematical model defining the dynamics and statics of a control valve, and on following the changes in these parameters. This makes it possible to detect and to conclude the faulted point. The advantage of the method is hat the faulted operation and the location of the faulted component can be defined for instance by means of the control signal and the valve position data only.

In order to detect erosion damage of the closure member or possible blockage in the valve body, it is necessary in addition to measure the pressure over the valve and to obtain data of the volume flow through the valve. This data can best be obtained through a data transfer bus from the measurement sensors.

BRIEF DESCRIPTION OF THE DRAWINGS

The invention and its details are further described with reference to the accompanying drawings in which FIGS. 5A and 5B show respectively, the mathematical representation of selected parameters such as the friction of the valve and the gain of the positioner while

Figure 1:
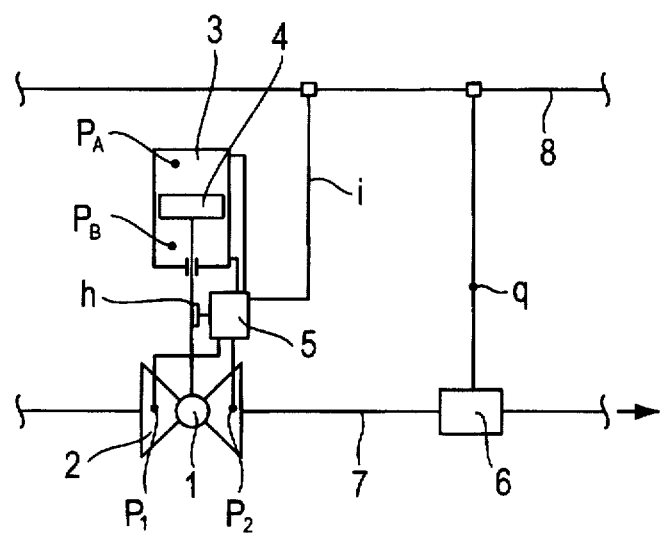
FIG. 1 shows schematically a measuring arrangement for the diagnostic system of an entire control valve assembly.

The measuring arrangement of FIG. 1 makes it possible to detect and locate a fault affecting the dynamics of a control valve assembly and to detect possible erosion of a closure member of the valve or blockage of the valve body.

In FIG. 1, the closure member 1 of a valve 2 is provided with an actuator 3 which operates the valve by means of a cylinder 4. A digital positioner 5 is connected to the actuator. A volume flow sensor 6 is connected between a discharge pipe 7 and a field bus 8.

In order to define the dynamic operation of the valve, only data about the control signal i and the valve position h from the position transmitter is required. In addition, the detection of erosion of the closure member 1 and blockage of the valve body 2 requires pressure measurements $p_1$, $p_2$ for instance from the valve body 2 and flow data q from the volume flow sensor 6. The volume flow data q can be transmitted to the positioner 5 of the control valve for instance by means of the digital field bus 8. In this case, also the desired value of the control signal i is transmitted to the positioner 5 of the control valve by means of the digital field bus 8.

The locating of a fault affecting the dynamics of a control valve assembly will be described in the following.

The following equation can be found for the mathematical model of a quarter turn control valve provided with a cylinder-piston operated actuator:

$$\left( m_{red} \cdot \frac{dx}{d\psi} + J \cdot b(\psi) \right) \frac{d^2\psi}{dt^2} + m_{red} \cdot \frac{d^2x}{d\psi^2} \left( \frac{d\psi}{dt} \right)^2 + \left( f_m \cdot \frac{dx}{d\psi} + f_v \cdot b(\psi) \right) \frac{d\psi}{dt} + b(\psi) \cdot M_\mu - F_m(p_A, p_B) = 0 \quad (1)$$

where x=distance travelled by the actuator piston
ψ=rotational angle of the valve
t=time
$m_{red}$=reduced mass of the actuator piston
J=combined inertia moment of the valve and the actuator
b=actuator coefficient
$M_\mu$=friction moment of the valve
$f_m$=attenuation coefficient of the actuator
$f_v$=attenuation coefficient of the valve
$F_m$=force applied to the actuator piston
$p_A$, $p_B$=pressure levels of the actuator cylinder Even if a quarter turn valve is discussed in this case, the method can be applied correspondingly to linear valves.

The movement of the actuator is controlled by means of the pressure levels of the cylinder which in the equation (1) are indicated by $p_A$, $p_B$. These can be computed by means of the following mathematical model defining the pressure level of the cylinder:

$$p_A = \Psi (k, V_A, T_a, m_a, A_A, x, R, M) \quad (2)$$

$$p_B = \Theta (k, V_B, m_B, m_b, A_B, x, R, M) \quad (3)$$

where

Ψ, Θ=mathematical functions
k=polytropic constant
$V_A$, $V_B$=air volumes of the actuator cylinder
$m_B$=mass of the air in the cylinder
$T_a$=temperature of the air entering the cylinder
$m_a$=mass flow of the air entering the cylinder
$m_b$=mass flow of the air leaving the cylinder
$A_A$, $A_B$=piston areas of the actuator
x=the same as in equation (1)
R=gas constant
M=mole mass The pressure levels are controlled by means of the mass flow entering and leaving the cylinder. The entering and leaving mass flows depend on the respective cross-sectional flow area of the regulating valve of the positioner. The cross-sectional flow area depends on the position of the spool or, in a poppet type construction, on the position of the seat of the regulating valve. Mathematically this can be written for one half of the actuator cylinder in the form:

$$m_a = f(A_a) = g(e) \quad (4)$$

where $A_a$=the effective cross-sectional flow area of one half A of the regulating valve
e=the position of the spool or the seat An accurate mathematical model can be found for the functions f and g appearing in the equation.

The position of the spool or the seat of the regulating valve can be computed from the mathematical model of the regulation of the regulating valve. The following mathematical connection can be found for the conventional positioners based on the feedback of the valve position:

$$e = \Theta(k_p, i, h) \quad (5)$$

where

Θ=mathematical function
$k_p$=gain of the positioner
i=control signal
h=opening of the control valve The following is a decription of the method of locating the fault.

The method according to the invention is based on the identification of the critical parameters describing the various components of a control valve assemby, such as the positioner, the actuator and the valve itself. Identification is a method where the parameters of a mathematical model of a device are found by means of actual measurement data by fitting the model to the measured data. The greater the number of the parameters to be identified, the more difficult the identification in practice is. The measurement data is obtained either by means of a separate test or tests or merely by following the dynamic operation of the device during the operation process.

In the method of the invention, measurement data is required only from the position of the valve and from the control signal. If measurement data is collected also from the cylinder pressures of the actuator, it will assist in finding the location of the fault.

The method is based on the fact that a test or a series of tests is carried out for instance by means of a digital positioner in order to collect the necessary measurement data. The measurement data can also be collected directly from a control valve assembly in operation when the control signal coming from the regulator to the valve changes sufficiently. The data measured is recorded in the memory of the positioner for the identification.

The critical parameter or parameters for each component of a control valve assembly, that is the positioner, the actuator and the valve itself, are identified from the above mathematical model by means of the measurement data. The critical parameters describing the operations of each component are chosen as the parameters to be identified.

The operation of a positioner is best described for instance by the gain $k_p$ of the positioner. The extent of the output moment of an actuator again is expressed for instance by the actuator coefficient b. A mechanical fault of a valve is usually disclosed by friction so that for instance the friction load $M_\mu$ is the most suitable parameter for identification.

Figure 2:
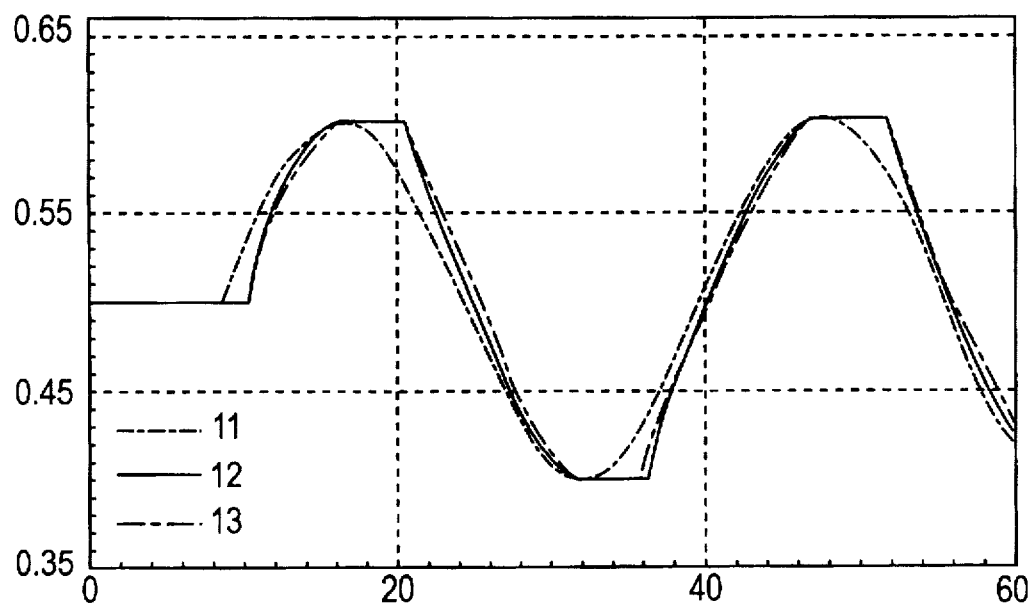
FIG. 2 shows a graph illustrating the correspondence between simulation carried out by means of identified parameters and measured values.

FIG. 2 illustrates the correspondence between simulation carried out with the identified parameters and the measured values. The curves show i/h as a function of time. Curve 11 presents input signal, curve 12 simulation and curve 13 measured data.

FIG. 2 shows measurement data produced by means of a sinusoidal control signal. The parameters of a simulating model made from a mathematical model were identified by means of the measurement data. The simulation carried out with the identified parameters corresponded well to the measured values as can be seen from FIG. 2.

The method can be made more accurate by measuring also the pressure levels $p_A$, $p_B$ of the cylinder. Due to the increased measurement data, for instance the cross-sectional flow area of the regulating valve of the positioner can be identified. This can be further used for detecting for instance dirt in the regulating valve.

By following the change of the identified critical parameters, it is possible to watch by means of a conclusion program the change of a parameter describing the operation of each component. If changes or sliding as a function of time takes place in a certain parameter, it shows that essential changes take place in the operation of the component. The direction of the change shows if the operation of the control valve is going towards better or worse. If the value of the critical parameter of a certain component has changed sufficiently to a certain direction, it discloses the faulted component. In the concluding, it is also possible to use a diagram illustrating the change of an error between the control signal and the position of the control valve. A change in this diagram discloses if the error of a control valve is increasing or decreasing.

By means of the above method, it is possible by utilizing a simple conclusion program to automatically seek in which component of the control valve assembly operational changes take place and which component probably is the reason for instance to impaired control accuracy.

The finding of erosion and blockage of a control valve will be described in the following.

The method is based on reviewing the characteristic curve of a valve mounted in a process piping system. In this method, for instance the volume flow through the valve has to be measured by means of a volume flow sensor, in addition to the measuring of the pressure by means of pressure sensors in the valve. This data can best be made available for instance by means of a field bus.

The detection of eroding and blockage of a control valve is based for instance on pressure data measured in the valve body and volume flow data obtained for instance by means of a field bus which are utilized for instance in a digital positioner or in auxiliary equipment where the computing and analyzing take place.

FIG. 1 shows an example where position and pressure sensors connected to the valve body 1 are used for defining the opening h of the valve and the incoming pressure $p_1$ and discharge pressure $p_2$. This data combined with the flow quantity q obtained from the volume flow sensor 6 makes it possible to compute the set capacity coefficient Cv of a control valve.

The data obtained from the measurements is collected for instance in the digital positioner 5 where the capacity coefficient of the said valve can be computed by means of the equations set forth in standard IEC534 (ISAS75).

The results obtained are compared to a capacity coefficient measured in a laboratory. From the change in the capacity coefficient, it can be seen if the valve is eroding or being blocked. If there is erosion in the valve, the capacity coefficient tends to increase, particularly with small openings. Correspondingly, blockage will cause the capacity coefficient to decrease, particularly with greater openings.

A fault in an eroded or in a blocked valve will best be detected by following the change in the capacity coefficient of the valve in relation to the original capacity coefficient.

Figure 5A:
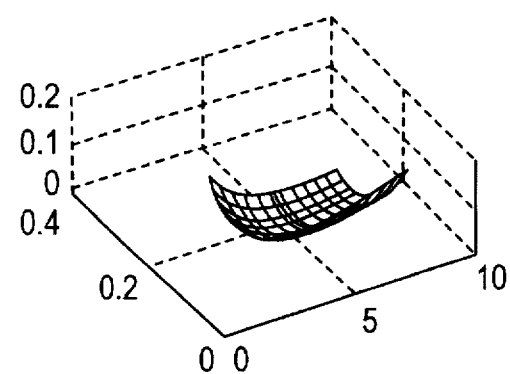
Figure 5C:
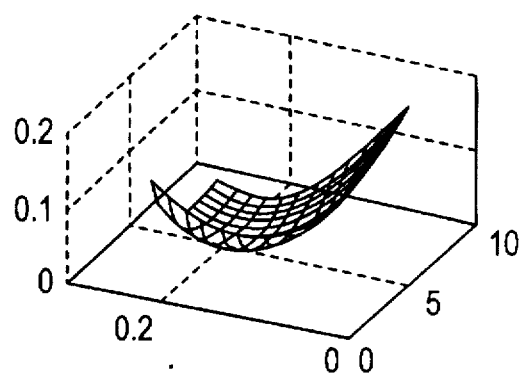
FIGS. 5C and 5D show the graphical representation of the maximum likelihood for a component causing an operational deviation.
Figure 5B:
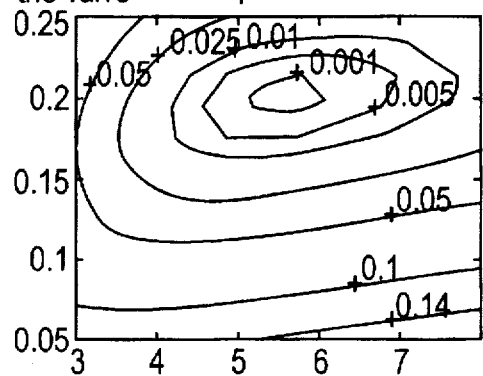
Figure 5D:
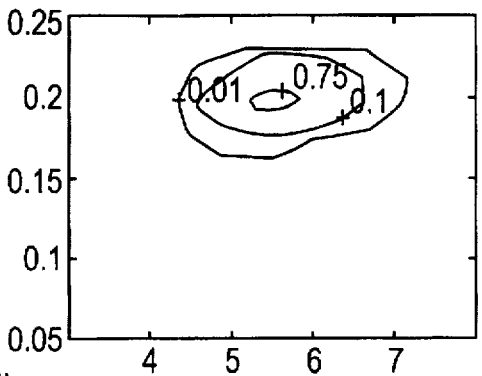
Figure 6:
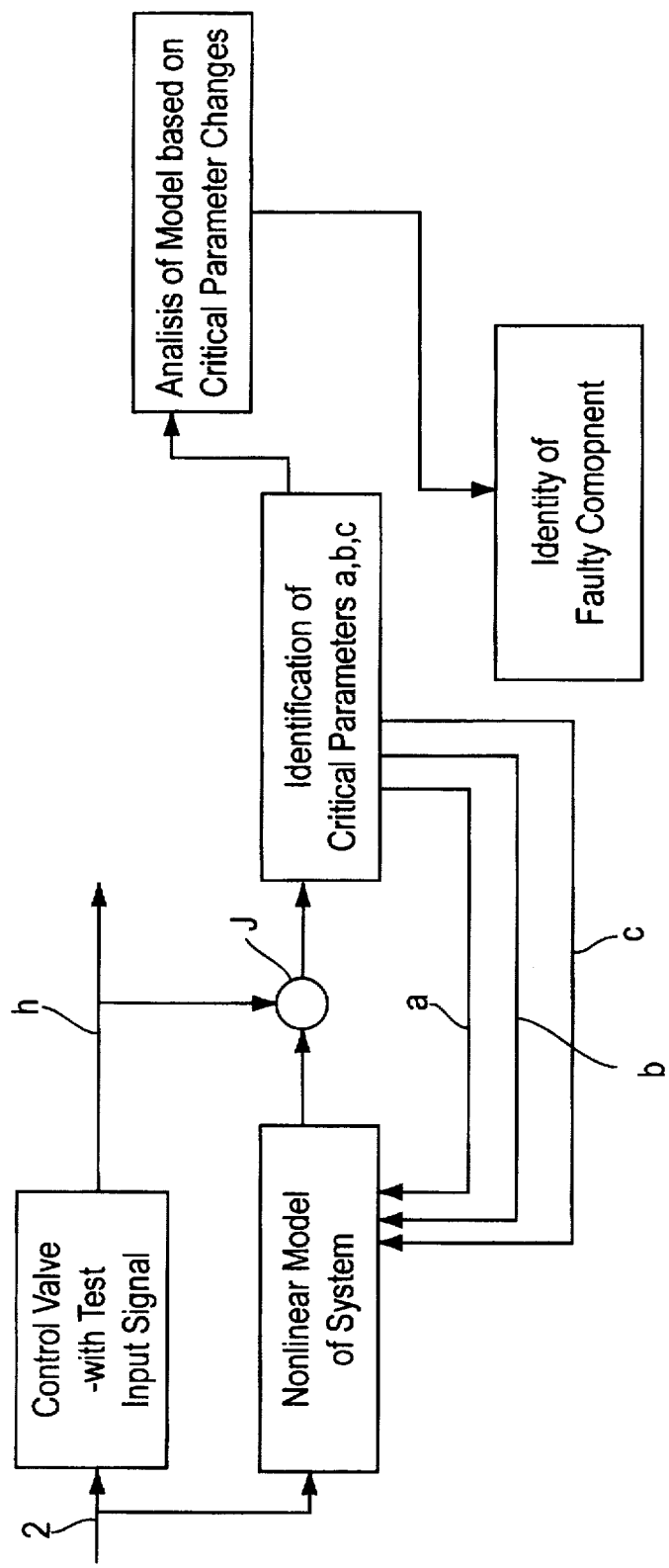
FIG. 6 is chart of the steps of a method according to the invention.

Thus, by the use of the model, and by the measurement of changes in selected parameters, a logic program operating on the selected parameter data may, for example, as represented in FIG. 6, result in elimination of components of the valve giving rise to a detected fault as illustrated in FIG. 5D, where the probability of a specific component or cause giving rise to the fault is graphically represented. A computer program useful in such an operation would be of the type that correlates the model to measured data from a test run or actual operation of the valve including such parameters as various flow characteristics in the vicinity of the valve, piston displacement for the valve actuator, force required to move the valve and the like. The valve may be operated over a range of values of the control signal and corresponding to positions of the valve member. The data is correlated to the mathematical model to determine if an operational deviation from the model exists as well as the probable identity of the critical parameter and the control valve element that may be causing the deviation. By use of only the control signal and the valve stem position, it is possible using the mathematical model previously established to determine the cause of an operational deviation from the model by a process of elimination that can be done with a simple computer program and by reiterations of the comparison or correlation of the model to the actual data, as shown by the graphical illustration of the model. As shown in FIG. 6, the steps of the present invention include operating a control valve with a test input signal I and noting the test output H. A parameter equal to the test input signal is supplied to a nonlinear model of the system and a deviation is determined in a summing operation such as at J. The critical parameters A, B and C are often known in advance but may require identification in running the system or in setting up the system. The value of one or more of the critical parameters, such as stem position, flow through the valve or the power required to operate the valve will be reiterated through the nonlinear model to supply information to a computer for analysis of the model based on the condition of changes in the critical parameters. This will eventually enable any defaulting element in the valve to be identified by a process of elminiation. Other possibilities will, of course, occur to those skilled in this art.

Figure 3:
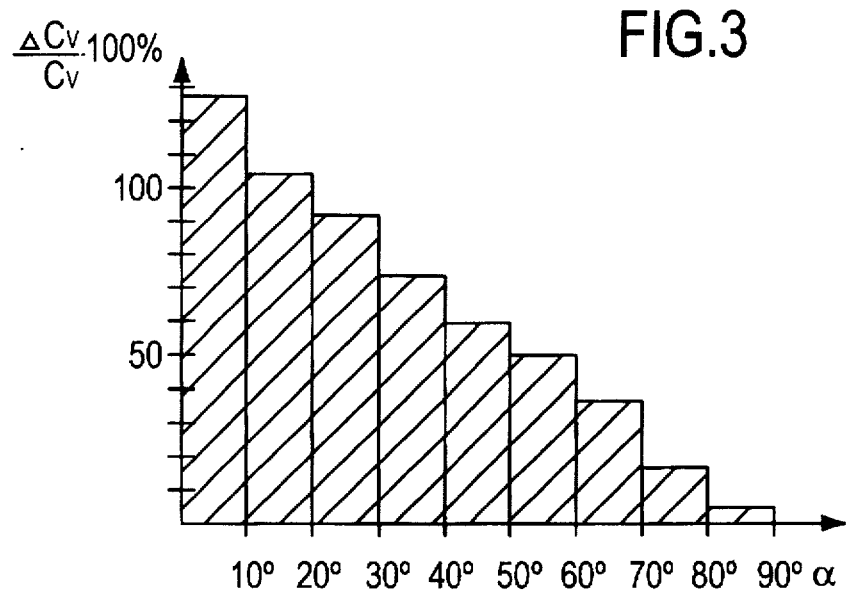
FIG. 3 shows graphically the relative change of the capacity coefficient of an eroded valve.

FIG. 3 shows the relative change of the capacity coefficient of an eroded valve as a function of the opening angle α. As can be seen from FIG. 3, the eroding can be very clearly seen, particularly at small opening angles. By following the relative change shown in FIG. 3 for instance by means of a digital positioner, it is possible to conclude the speed of erosion of the valve and to decide when the valve has to be changed at the latest.

Figure 4:
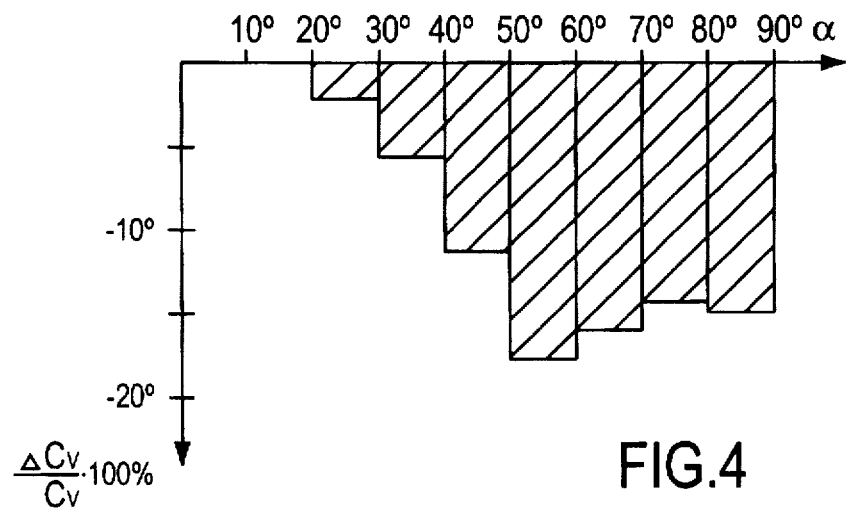
FIG. 4 shows graphically the decrease of the relative capacity coefficient of a blocked valve.

FIG. 4 shows the change of the capacity coefficient of a blocked valve in relation to the original capacity coefficient. As can be seen from FIG. 4, the reduction of the capacity coefficient, caused by blockage, can in the measured case be seen more clearly at greater opening angles.

The invention is not restricted to the above embodiments but it may vary within the scope of the claims. Instead of a rotational valve, the control valve can be also a linear valve. The actuator need not be cylinder-piston operated, it can be for instance electrically operated.

I claim:

1. A method for determining the cause of a fault in an automatically operated valve assembly of the type having a plurality of elements including at least an actuator, a valve member and positioner controlled by a control signal, comprising the steps of:

a) defining a mathematical model for operation of the control valve assembly including assigning values to critical parameters including at least the control signal and the position of the valve member, b) deriving data corresponding to a plurality of values of the control signal and corresponding positions of the valve member, c) correlating the mathematical model to the data measured from the control signal and the corresponding positions of the valve member to determine both if an operational deviation from the model exists in the valve assembly and the identity of the critical parameter and control valve element causing the deviation.

2. The method as claimed in claim 1 wherein the control valve assembly includes a cylinder-piston operated actuator and the method that includes measuring cylinder pressures as part of the data.

3. A method according to claim 1, characterized in that the measured data includes data also from the incoming and discharge pressures ($p_1$, $p_2$) of the control valve and from the volume flow (q) through the control valve, and erosion of the closure member of the control valve or blockage of the valve body is detected.

4. A method according to claim 1, characterized in that the gain ($k_p$) of the positioner is used as the critical parameter for the positioner.

5. A method according to claim 1, characterized in that the actuator coefficient (b) is used as the critical parameter for the actuator.

6. A method according to claim 1, characterized in that the friction load ($M_\mu$) of the control valve is used as the critical parameter for the control valve.

7. A method for determining the cause of a fault in an automatically operated valve assembly of the type having a plurality of elements including at least an actuator, a valve member and positioner controlled by a control signal, comprising the steps of:

a) defining a mathematical model for operation of the control valve assembly including assigning values to critical parameters including at least the control signal and the position of the valve member, b) deriving data corresponding to a plurality of values of the control signal and corresponding positions of the valve member, c) correlating the mathematical model to the data measured from the control signal and the corresponding positions of the valve member to determine both if an operational deviation from the model exists in the valve assembly and the probable identity of the critical parameter and control valve element causing the deviation, said control valve assembly including a quarter turn valve and a cylinder-piston operated actuator and wherein the following equation is used as the mathematical model:

$$\left( m_{red} \cdot \frac{dx}{d\psi} + J \cdot b(\psi) \right) \frac{d^2\psi}{dt^2} + m_{red} \cdot \frac{d^2x}{d\psi^2} \left( \frac{d\psi}{dt} \right)^2 + \left( f_m \cdot \frac{dx}{d\psi} + f_v \cdot b(\psi) \right) \frac{d\psi}{dt} + b(\psi) \cdot M_\mu - F_m(p_A, p_B) = 0 \quad (1)$$

where x=distance travelled by the actuator $\psi$=rotational angle of the valve t=time $m_{red}$=reduced mass of the actuator J=combined inertia moment of the valve and the actuator b=actuator coefficient $M_\mu$=friction moment of the valve $f_m$=attenuation coefficient of the actuator $f_v$=attenuation coefficient of the valve $F_m$=force applied to the actuator piston $p_A$, $p_B$=pressure levels of the actuator cylinder.

8. A method according to claim 7, characterized in that the pressure levels of the actuator cylinder are computed by means of the following mathematical model:

$$p_A = \Psi(k, V_A, T_a, m_a, A_A, x, R, M) \quad (2)$$

$$p_B = \Theta(k, V_B, m_B, m_b, A_B, X, R, M) \quad (3)$$

where $\Psi$, $\Theta$=mathematical functions k=polytropic constant $V_A$, $V_B$=air volumes of the actuator cylinder $m_B$=mass of the air in the cylinder $T_a$=temperature of the air entering the cylinder $m_a$=mass flow of the air entering the cylinder $m_b$=mass flow of the air leaving the cylinder $A_A$, $A_B$=piston areas of the actuator x=the same as in equation (1)

R=gas constant

M=mole mass.

9. A method according to claim 8, characterized in that the mass flow of the air entering one half of the actuator cylinder is computed from the following:

$$m_a = f(A_a) \cdot g(e) \quad (4)$$

where f, g=mathematical functions $A_a$=the effective cross-sectional flow area of one half A of the regulating valve e=the position of the spool or the poppet.

10. A method according to claim 9, characterized in that the position of the spool or the poppet of the regulating valve of the positioner is computed from the following:

$$e = \Phi(k_p, i, h) \quad (5)$$

where $\Phi$=mathematical function $k_p$=gain of the positioner i=control signal h=opening of the control valve.

* * * * *